United States Patent
Hingne et al.

(10) Patent No.: US 11,337,355 B2
(45) Date of Patent: May 24, 2022

(54) TRAILER DEVICE FOR AN AGRICULTURAL VEHICLE

(71) Applicant: DEERE & COMPANY, Moline, IL (US)

(72) Inventors: Abhijeet Hingne, Khamgaon (IN); Amol Adsul, Satara (IN); Benjamin Spohn, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 264 days.

(21) Appl. No.: 16/832,349

(22) Filed: Mar. 27, 2020

(65) Prior Publication Data

US 2020/0305333 A1    Oct. 1, 2020

(30) Foreign Application Priority Data

Mar. 29, 2019    (DE) .......................... 102019204473.5

(51) Int. Cl.
*A01B 59/04* (2006.01)
*B60D 1/24* (2006.01)
(Continued)

(52) U.S. Cl.
CPC .............. *A01B 59/04* (2013.01); *B60D 1/246* (2013.01); *B60D 1/363* (2013.01); *B60D 1/465* (2013.01);
(Continued)

(58) Field of Classification Search
CPC ........ A01B 59/04; B60D 1/246; B60D 1/363; B60D 1/465; B60D 1/065; B60D 2001/008
(Continued)

(56) References Cited

U.S. PATENT DOCUMENTS 2,808,272 A * 10/1957 Reese .................... B60D 1/065
                                                    280/406.2
6,182,997 B1 * 2/2001 Ullrich .................. B60D 1/247
                                                    280/405.1
(Continued)

FOREIGN PATENT DOCUMENTS

DE         10065161 A1    7/2002
DE     102016212624 A1    1/2017
(Continued)

OTHER PUBLICATIONS

European Search Report issued in counterpart application No. 20163723.8 dated Aug. 4, 2020 (08 pages).
(Continued)

*Primary Examiner* — Kevin Hurley
*Assistant Examiner* — Felicia L. Brittman

(57) ABSTRACT

A trailer device for an agricultural vehicle includes a frame part and a guide part longitudinally, displaceably mounted in the frame part. The guide part includes a coupling element provided on an end face. The frame part is pivoted by a lifting apparatus for raising and lowering the coupling element relative to a base frame for attaching to a load-bearing vehicle structure. The device includes at least one spring element arranged between the base frame and the frame part such that the spring element exerts a pretensioning force on the frame part for assisting the raising of the coupling element.

20 Claims, 5 Drawing Sheets

(51) Int. Cl.
  *B60D 1/36* (2006.01)
  *B60D 1/46* (2006.01)
  *B60D 1/00* (2006.01)
  *B60D 1/06* (2006.01)

(52) U.S. Cl.
  CPC ........ *B60D 1/065* (2013.01); *B60D 2001/008* (2013.01)

(58) Field of Classification Search
  USPC ....................................................... 280/400
  See application file for complete search history.

(56) References Cited

U.S. PATENT DOCUMENTS

| | | | |
|---|---|---|---|
| 7,168,661 B1* | 1/2007 | Fox .......................... | B60D 1/36 104/20 |
| 9,315,141 B1* | 4/2016 | Piercey, III .............. | B60D 1/07 |
| 2017/0086346 A1* | 3/2017 | Payne .................. | A01B 59/042 |

FOREIGN PATENT DOCUMENTS

| | | | | |
|---|---|---|---|---|
| EP | 1982853 A1 | 10/2008 | | |
| EP | 2939856 B1 | 2/2019 | | |
| GB | 1370363 A | 10/1974 | | |
| GB | 2217169 A | 10/1989 | | |
| GB | 2396283 A | 6/2004 | | |
| GB | 2456892 A | * | 8/2009 | ............. B60D 1/465 |

OTHER PUBLICATIONS

Bennett Uniglide tractor pick-up hitch, pp. 1 [online], dated Nov. 14, 2015. Retrieved from the Internet: <URL: https://www.youtube.com/watch?v=oswaAej8jWY>.

Bennett Uniglide Animated Open & Close, pp. 1 [online], dated Dec. 18, 2015. Retrieved from the Internet: <URL: https://www.youtube.com/watch?v=6gD-jAXtkh0>.

Fergie pick up hitch, first pick up ted20 te20, pp. 1 [online], dated May 20, 2014. Retrieved from the Internet: <URL: https://www.youtube.com/watch?v=gN4WErOjQbE>.

* cited by examiner

TRAILER DEVICE FOR AN AGRICULTURAL VEHICLE

RELATED APPLICATIONS

This application claims priority to German Patent Application Ser. No. 102019204473.5, filed Mar. 29, 2019, the disclosure of which is hereby incorporated by reference in its entirety.

FIELD OF THE DISCLOSURE

The present disclosure relates to a trailer device for an agricultural vehicle having a frame part and a guide part which is longitudinally, displaceably mounted in the frame part and which has a coupling element provided on the end face, wherein the frame part may be pivoted by a lifting apparatus for raising and lowering the coupling element relative to a base frame for attaching to a load-bearing vehicle structure.

BACKGROUND

A conventional trailer device, which is generally also known by the term "pick-up hitch," is disclosed, for example, in DE 100 65 161 A1. The trailer device includes an upper frame part, a lower frame part and a guide part with a coupling ball attached thereto. The upper frame part is rigidly attached to a rear axle differential housing of an agricultural vehicle by associated fastening plates and in this regard forms a part of the vehicle body. A horizontal pivot axis running transversely to the vehicle longitudinal direction is formed in the front region of the frame part, the front end of the lower frame part being articulated on the pivot axis. In the region of the rear end, two bolts which are oriented transversely outwardly are provided on the lower frame part. The ends of a hydraulic lifting rod system may be attached to these bolts, the lower frame part being adjustable by the lifting rod system about the horizontal pivot axis so that the rear end thereof may be raised or lowered together with the coupling ball, as desired. The lower frame part is configured in the manner of a cassette and has a substantially rectangular channel in which the guide part is displaceably mounted in the longitudinal direction. For displacing the guide part a hydraulic cylinder is used, the one end thereof acting on the horizontal pivot axis and the other end thereof acting on the guide part.

The permitted lifting loads in this case are substantially defined by the output capacity of the hydraulic lifting rod system. Due to constructional space restrictions and the hydraulic output to be maintained in the system, the permitted lifting load may not be increased in a simple manner.

Thus, there is a need to develop a trailer device which provides an increase in the permitted lifting load with relatively little effort.

SUMMARY

In the present disclosure, a trailer device for an agricultural vehicle includes a frame part and a guide part which is longitudinally displaceably mounted in the frame part and which has a coupling element provided on the end face, wherein the frame part may be pivoted by a lifting apparatus for raising and lowering the coupling element relative to a base frame for attaching to a load-bearing vehicle structure. At least one spring element is arranged between the base frame and the frame part, such that the spring element exerts a pretensioning force on the frame part assisting the raising of the coupling element. Thus, without changing the design of the lifting apparatus, a permissible lifting load which is increased by the amount of pretensioning may be achieved, which results in a correspondingly improved utilization of the hydraulic output to be maintained in the system, in particular in the case of a lifting apparatus which is configured as a hydraulic lifting rod system. An adaptation of the structure, which might become necessary due to the load, is limited in this case to the remaining load-bearing components of the trailer device.

The lifting apparatus has to be able to exert corresponding adjusting forces in both actuating directions, since when the frame part is lowered, when a trailer load is not present on the coupling element, substantially the entire pretensioning of the spring element has to be overcome. In the case of the use of a hydraulic lifting rod system with a hydraulic cylinder, this hydraulic cylinder is configured to be dual-acting. Alternatively, however, the use of adjusting drives provided with hydraulic or electric motors is also conceivable.

The use of the trailer device according to the present disclosure may be effectively demonstrated by the following calculation by way of example: if it is assumed that the maximum adjusting force of the lifting apparatus is 70 kN and the pretensioning force of the spring element is selected such that it corresponds to a counterforce of 30 kN, a maximum total lifting force of 70 kN+30 kN=100 kN is produced when using one and the same lifting apparatus.

The trailer device is a component of an agricultural vehicle, which may be configured as an agricultural tractor. The frame part in this case is pivotably articulated via the base frame on the load-bearing vehicle structure which is configured as a rear axle differential housing. The coupling element, for example, is a ball coupling which is removable from the guide part for attaching various agricultural attachments or add-on devices.

In order to ensure a uniform load distribution inside the load-bearing components of the trailer device, there is the possibility that a total of two spring elements run in a symmetrical arrangement on either side of the frame part. In this case, these spring elements have the same dimensioning relative to their spring characteristic curve.

The spring element may, in particular, be a leaf spring which is dirt-resistant and simple to manufacture, wherein the leaf spring is fastened in a first end region to the base frame and in a second end region—whatever the respective pivoted position of the frame part—the leaf spring bears fixedly against a counter bearing of the frame part. The latter permits not only a smooth pivoting of the frame part but also provides additional security in the case of malfunction or rupture of the counter bearing attached thereto.

The counter bearing may be a bearing bolt protruding to the side on the frame part, wherein the second end region of the leaf spring at least partially encompasses the bearing bolt in an arcuate manner, so that a deformation of the leaf spring occurring when the frame part is lowered may be taken into account, such that the leaf spring is precluded from springing off or slipping off the bearing bolt.

In order to relieve the leaf spring of load in the region of its fastening to the base frame, with regard to an introduction of force which is as extensive as possible, it is advantageous if the leaf spring in the first end region is attached by a conically shaped mount following a curved path of the leaf spring when the frame part is raised and lowered.

Moreover, the leaf spring may be placed under pretensioning by means of a running roller bearing against the frame part in an intermediate region. The running roller is positioned on the frame part such that even when the frame part is fully raised a residual tension is maintained inside the leaf spring. In this manner, vibrations which have been excited by the traveling movement, which may lead to rattling noises or the like, may be reliably avoided.

According to an alternative embodiment of the at least one spring element, the spring element may be a tension spring. The tension spring in this case is fastened in a first end region to the base frame and in a second end region to a counter bearing of the frame part. The tension spring is a helical spring which is produced from steel and which in the first end region is suspended by a first limb on a projection on the base frame and in the second end region by a second limb on the counter bearing.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the figure.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
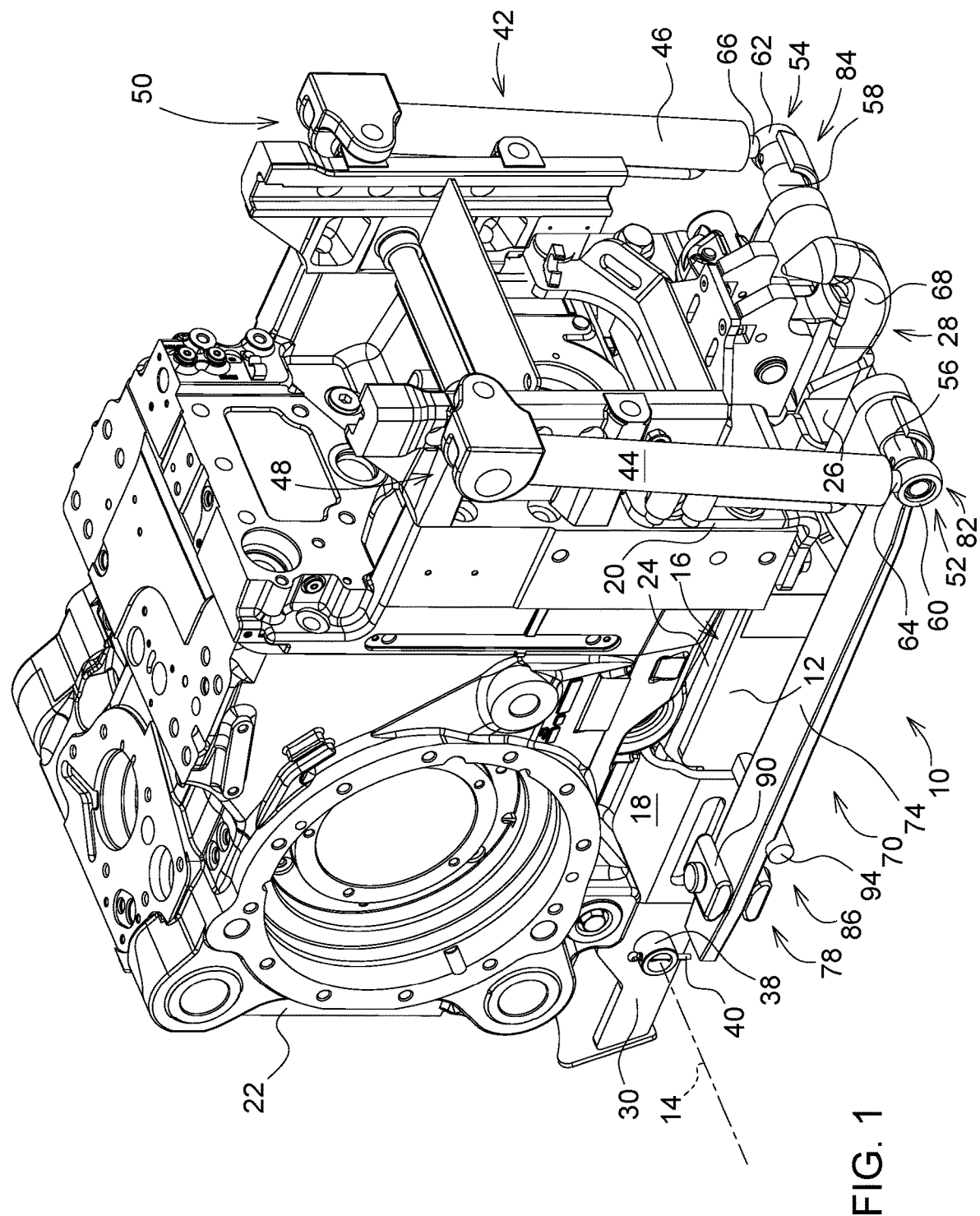
FIG. 1 shows a first embodiment of a trailer device according to the present disclosure with a spring element configured as a leaf spring in a fully lowered operating position.
Figure 2:
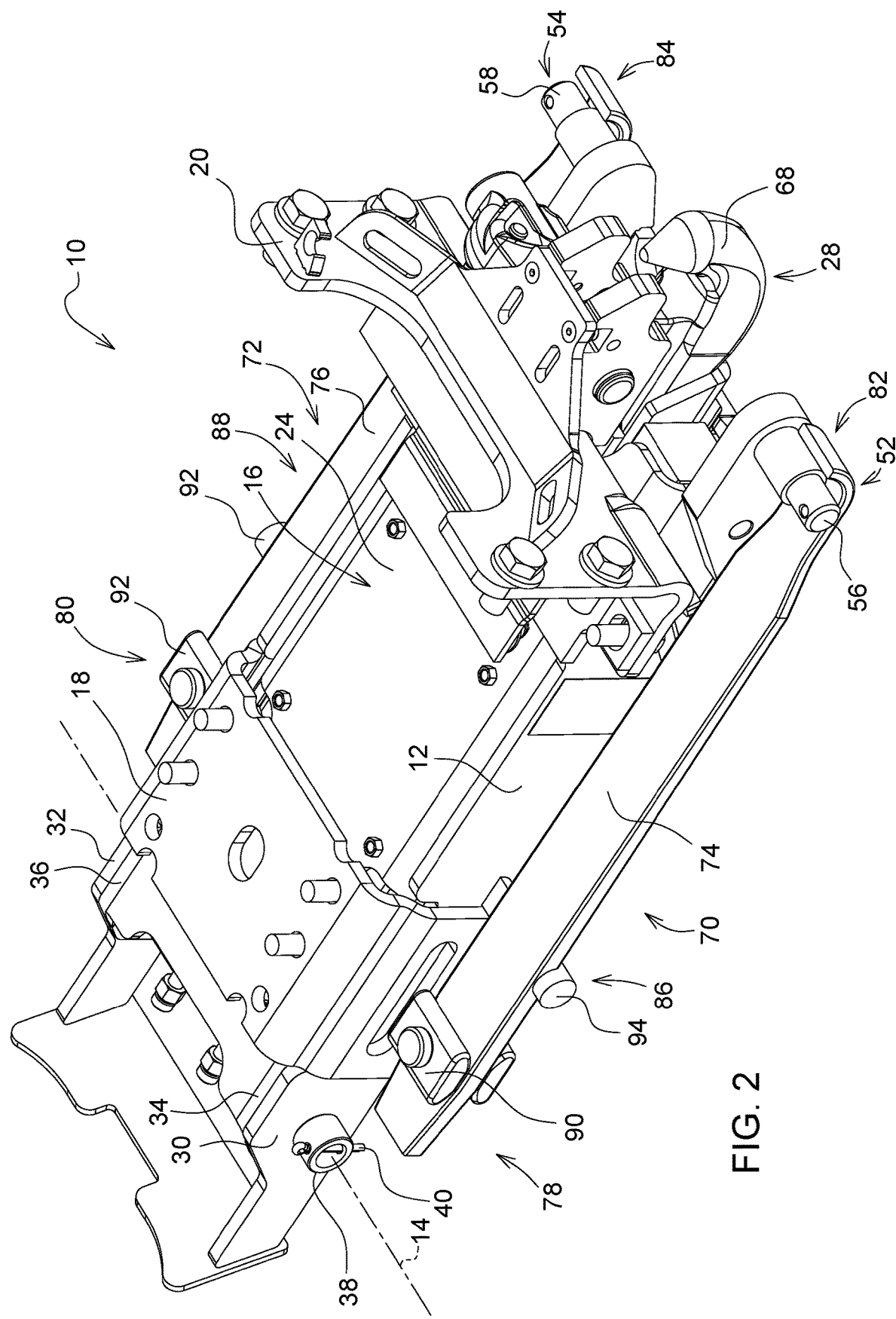
FIG. 2 shows a simplified view of the trailer device of FIG. 1.

FIG. 1 shows a first embodiment of a trailer device according to the present disclosure in the form of a so-called pick-up hitch on an agricultural vehicle configured as an agricultural tractor, wherein reference might additionally be made to the simplified view in FIG. 2 relative to structural details.

The trailer device 10, provided in a rear region of the agricultural tractor (not illustrated), comprises a base frame 12 and a frame part 16 articulated to the base frame 12 by a horizontal pivot axis 14. The base frame 12 is mounted via a first or second fastening flange 18, 20 on a lower face or rear face of a load-bearing vehicle structure configured as a rear axle differential housing 22 of the agricultural tractor, by associated screw bolts. The frame part 16 forms a cassette-like housing 24, a guide part 26 being longitudinally displaceably mounted therein by a coupling element 28 provided on the end face. A hydraulic cylinder running inside the cassette-like housing 24 (not visible in the present case) serves for the longitudinal adjustment, the hydraulic cylinder permitting in turn a hydraulic control system which is present in the agricultural tractor to be retracted and extended for coupling and uncoupling an agricultural attachment or add-on device.

In the present case, the horizontal pivot axis 14 provided for the articulation of the frame part 16 is formed by a hollow shaft 38 extending through opposing frame sides 30, 32, 34, 36 of the base frame 12 or the frame part 16. The hollow shaft 38 is secured to the front face by associated split pins 40.

Moreover, a lifting apparatus which is configured as a hydraulic lifting rod system 42 is present. The hydraulic lifting rod system 42 comprises left-hand and right-hand hydraulic cylinders 44, 46, each thereof being connected via an upper joint 48, 50 to the rear axle differential housing 22 and to a lower joint 52, 54 which is formed by bearing bolts 56, 58 protruding to the side on the frame part 16 for attaching a fastening eye 60, 62 of a cylinder piston 64, 66, so that the frame part 16 may be pivoted relative to the base frame 12 and thus the rear axle differential housing 22 for raising and lowering the coupling element 28. The hydraulic cylinders 44, 46, which may be retracted and extended to initiate the hydraulic control system in this case, are configured to be dual-acting so that the hydraulic lifting rod system 42 is able to exert corresponding adjusting forces in both actuating directions.

The coupling element 28 is a ball coupling 68 which is removable from the guide part 26 in order to attach various agricultural attachments or add-on devices.

The basic function of the trailer device 10 corresponds to that of a conventional pick-up hitch, so that in this regard further details are not to be provided below.

Additionally, left-hand and right-hand spring elements 70, 72 having the same dimensioning relative to their spring characteristic curve are arranged between the base frame 12 and the frame part 16, such that the spring elements exert a pretensioning on the frame part 16 which assists the raising of the coupling element 28. The two spring elements 70, 72 run in a symmetrical arrangement on either side of the frame part 16.

According to FIGS. 1 and 2, the spring elements 70, 72 are leaf springs 74, 76, wherein each of the leaf springs 74, 76 is fastened in a first end region 78, 80 to the base frame 12 and in a second end region 82, 84, whatever the respective pivoted position of the frame part 16, bears fixedly against a counter bearing 86, 88 of the frame part 16.

The counter bearing 86, 88 in the present case is identical to the bearing bolt 56, 58 protruding to the side on the frame part 16, wherein the second end region 82, 84 of the leaf spring 74, 76 at least partially encompasses the bearing bolt 56, 58 in an arcuate manner.

In order to relieve the leaf spring 74, 76 of load in the region of its fastening to the base frame 12, in the present case the leaf spring is attached in the first end region 78, 80 by a conically shaped mount 90, 92, following a curved path of the leaf spring 74, 76 when the frame part 16 is raised and lowered.

The leaf spring 74, 76 is placed under pretensioning by a running roller 94, 96 bearing against the frame part 16 in an intermediate region. The running roller 94, 96 is positioned on the frame part 16 such that even when the frame part 16 is fully raised, a residual tension is maintained inside the leaf spring 74, 76.

The structure of the right-hand mount 92 or the right-hand running roller 96 in this case are concealed in the view in FIGS. 1 and 2 and thus are not visible.

Figure 3:
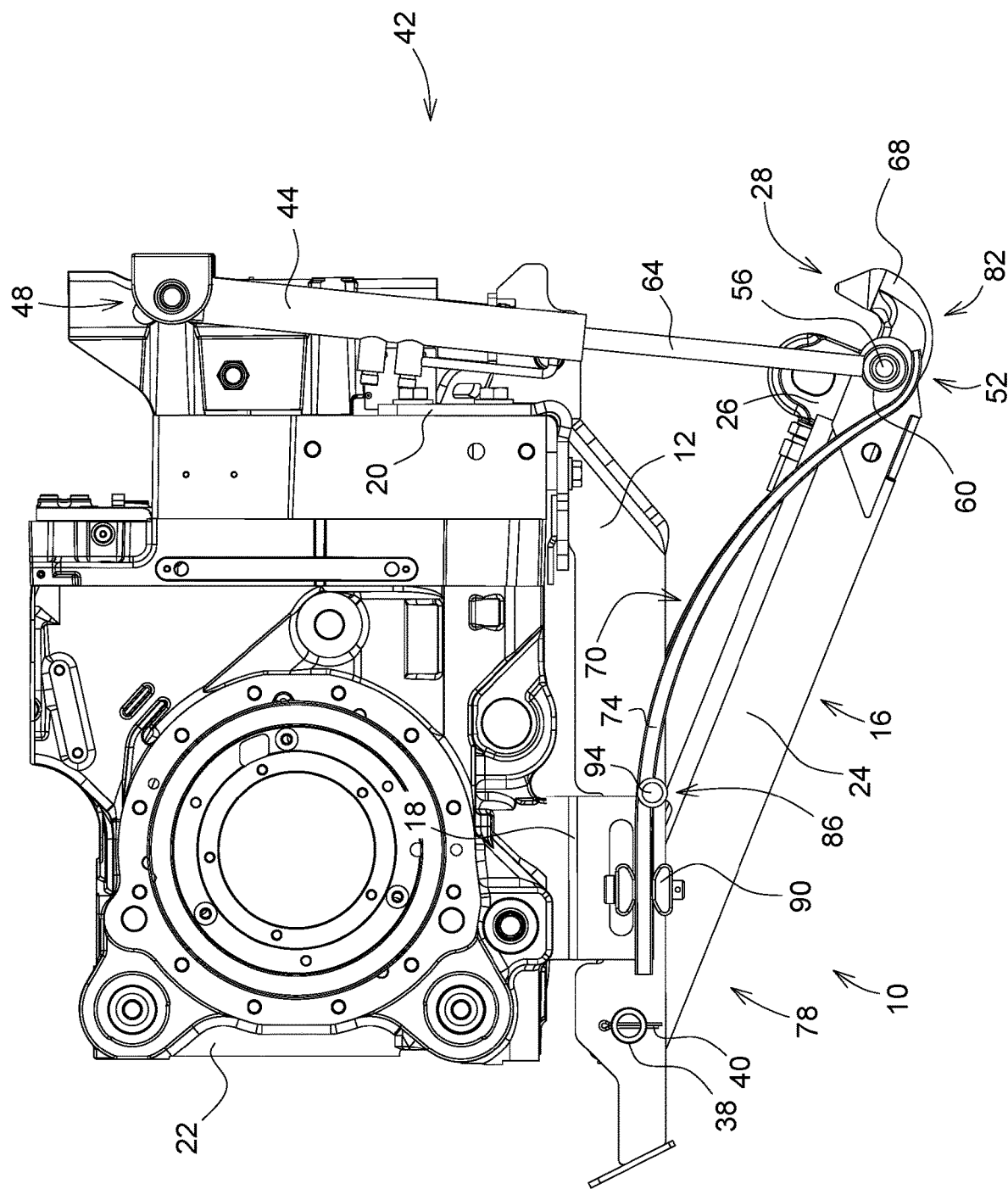
FIG. 3 shows the trailer device of FIG. 1 in a fully raised operating position.
Figure 4:
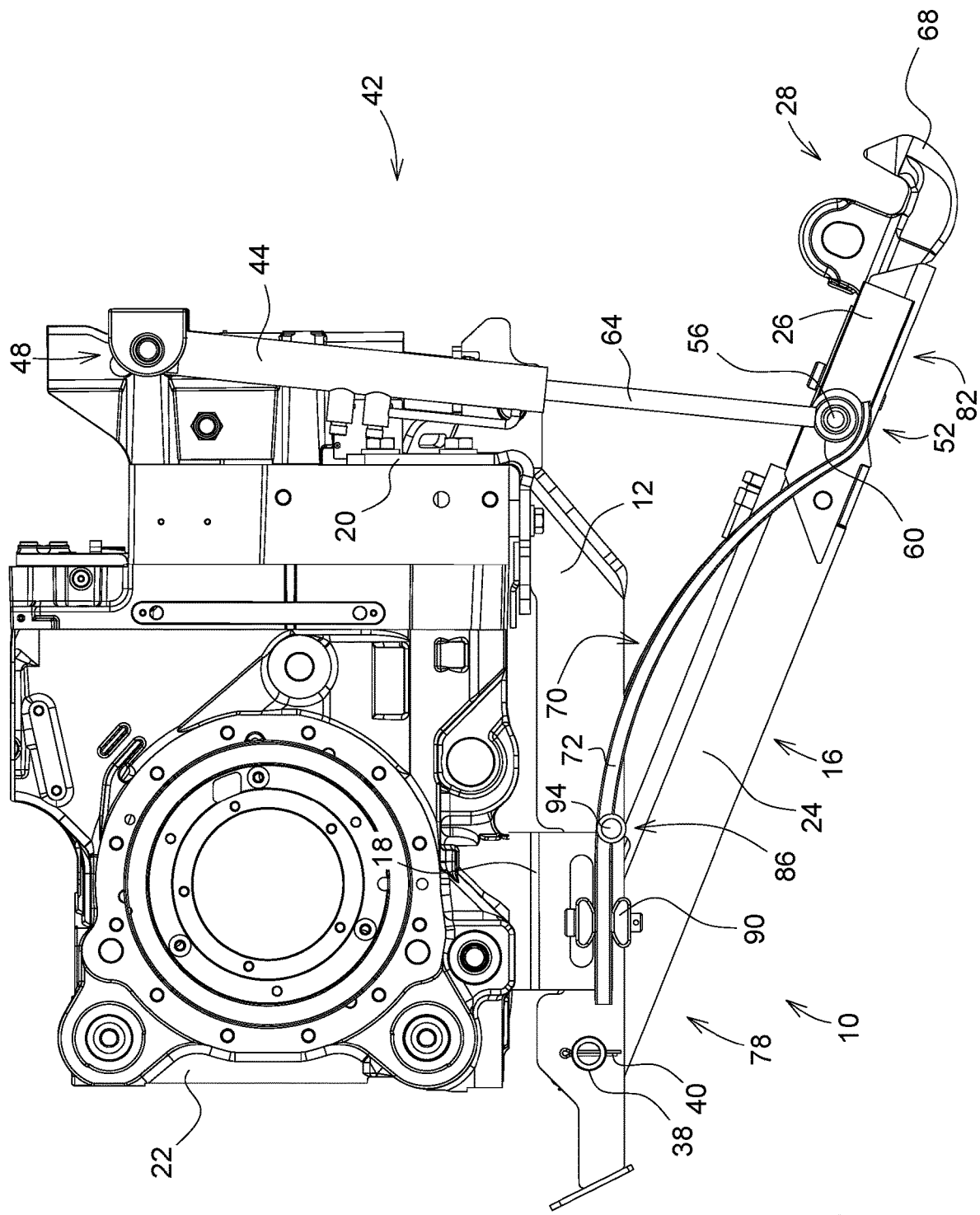
FIG. 4 shows the trailer device of FIG. 3 with the additionally extended guide part.

In FIGS. 1 and 2, the frame part 16 is located in a fully raised operating position, but in FIGS. 3 and 4 the frame part is shown in a fully lowered operating position. Additionally in FIG. 4, the guide part 26 is extended in order to receive by the coupling element 28 a complementary coupling part, not shown, of an agricultural attachment or add-on device.

Figure 5:
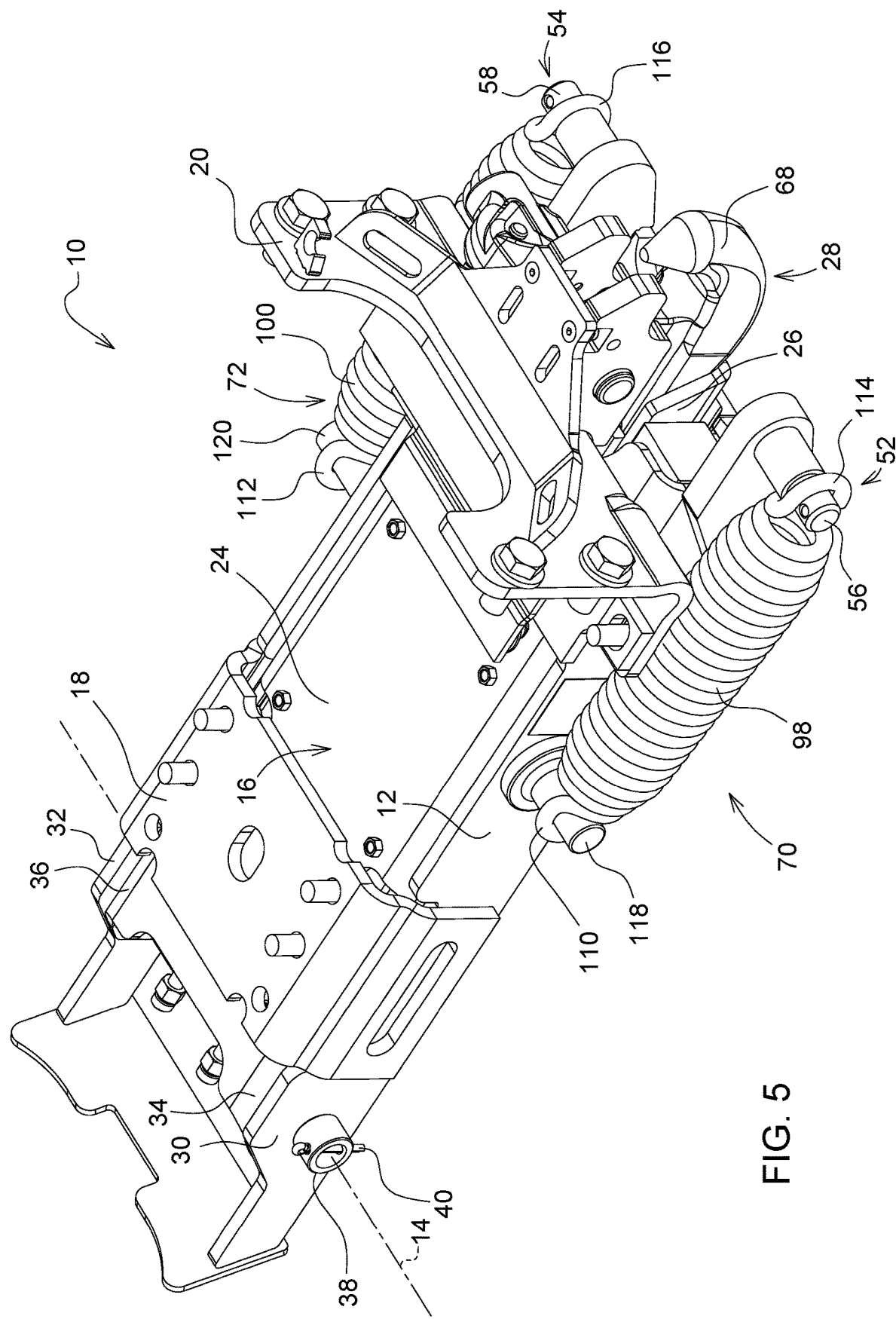
FIG. 5 shows a second embodiment of the trailer device with a spring element configured as a tension spring.

FIG. 5 shows a second embodiment of the trailer device 10 according to the present disclosure. Accordingly, the spring element 70, 72 is a tension spring 98, 100. The tension spring 98, 100 in this case is fastened in a first end region 102, 104 to the base frame 12 and in a second end region 106, 108 to the counter bearing 86, 88 of the frame part 16. The tension spring 98, 100 is a helical spring which is produced from steel and which in the first end region 102, 104 is suspended by a first limb 110, 112 on a projection 118, 120 on the base frame 12 and in the second end region 106, 108 by a second limb 114, 116 on the counter bearing 86, 88.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A trailer device for an agricultural vehicle, comprising:
a frame part; and
a guide part longitudinally, displaceably mounted in the frame part, the guide part having a coupling element provided on an end face;
wherein the frame part is pivoted by a lifting apparatus for raising and lowering the coupling element relative to a base frame for attaching to a load-bearing vehicle structure;
wherein, at least one spring element is arranged between the base frame and the frame part,
further wherein, the spring element operably exerts a pretensioning force on the frame part for assisting the raising of the coupling element.

2. The trailer device of claim 1, wherein the at least one spring element comprises two spring elements positioned in a symmetrical arrangement on either side of the frame part.

3. The trailer device of claim 1, wherein the at least one spring element comprises a leaf spring.

4. The trailer device of claim 3, wherein the leaf spring comprises a first end region and a second end region, where the first end region is fastened to the base frame and the leaf spring bears against a counter bearing of the frame part in the second end region.

5. The trailer device of claim 4, wherein the counter bearing comprises a bearing bolt protruding to a side on the frame part.

6. The trailer device of claim 5, wherein the second end region of the leaf spring partially encompasses the bearing bolt in an arcuate manner.

7. The trailer device of claim 4, wherein the leaf spring in the first end region is attached by a conically shaped mount following a curved path of the leaf spring when the frame part is raised and lowered.

8. The trailer device of claim 3, wherein the leaf spring is placed under pretensioning by a running roller bearing against the frame part in an intermediate region.

9. The trailer device of claim 1, wherein the at least one spring element comprises a tension spring.

10. The trailer device of claim 9, wherein the tension spring is fastened in a first end region to the base frame and in a second end region to a counter bearing of the frame part.

11. The trailer device of claim 1, wherein the frame part forms a cassette-like housing.

12. An agricultural vehicle, comprising:
a load-bearing vehicle structure; and
a trailer device mounted to the vehicle structure, the trailer device comprising:
a base part and a frame part, the frame part being pivotally articulated about an axis relative to the base part;
a guide part displaceably mounted in the frame part, the guide part having a coupling element provided on an end face;
a lifting apparatus for raising and lowering the coupling element relative to a base frame for attaching to the vehicle structure; and
a spring element arranged between the base frame and the frame part,
wherein, the spring element operably exerts a pretensioning force on the frame part for assisting the raising of the coupling element.

13. The agricultural vehicle of claim 12, wherein the frame part forms a cassette-like housing.

14. The agricultural vehicle of claim 13, wherein the lifting apparatus is positioned within the housing.

15. The agricultural vehicle of claim 12, wherein the spring element comprises two spring elements positioned in a symmetrical arrangement on either side of the frame part.

16. The agricultural vehicle of claim 12, wherein the spring element comprises a leaf spring having a first end region and a second end region, where the first end region is fastened to the base frame and the leaf spring bears against a counter bearing of the frame part in the second end region.

17. The agricultural vehicle of claim 16, wherein:
the counter bearing comprises a bearing bolt protruding to a side on the frame part; and
the second end region of the leaf spring partially encompasses the bearing bolt in an arcuate manner.

18. The agricultural vehicle of claim 16, wherein the leaf spring in the first end region is attached by a conically shaped mount following a curved path of the leaf spring when the frame part is raised and lowered.

19. The agricultural vehicle of claim 12, wherein the at least one spring element comprises a tension spring fastened in a first end region to the base frame and in a second end region to a counter bearing of the frame part.

20. A trailer device mounted to a load-bearing vehicle structure of an agricultural vehicle, comprising:
a base part;
a frame part forming a cassette-like housing and being pivotally articulated about an axis relative to the base part;
a guide part displaceably mounted in the frame part, the guide part comprising a coupling element;
a lifting apparatus for raising and lowering the coupling element relative to a base frame for attaching to the vehicle structure, the lifting apparatus located in the cassette-like housing; and
a spring element arranged between the base frame and the frame part;
wherein, the spring element operably exerts a pretensioning force on the frame part for assisting the raising of the coupling element.

* * * * *